United States Patent
Beierle

(10) Patent No.: US 6,483,865 B1
(45) Date of Patent: Nov. 19, 2002

(54) WIRELESS INTERFACE FOR ELECTRONIC DEVICES LOCATED IN ENCLOSED SPACES

(75) Inventor: Robert T. Beierle, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/548,698

(22) Filed: Apr. 13, 2000

(51) Int. Cl.$^7$ ............................................... H04B 7/185
(52) U.S. Cl. ....................................................... 375/130
(58) Field of Search ................................ 375/130, 141, 375/219, 377; 455/426, 88, 427

(56) References Cited

U.S. PATENT DOCUMENTS

| | | | |
|---|---|---|---|
| 5,486,830 A | * 1/1996 | Axline, Jr. et al. | 342/43 |
| 5,535,238 A | * 7/1996 | Schilling et al. | 375/142 |
| 5,543,779 A | 8/1996 | Aspesi et al. | |
| 5,559,865 A | 9/1996 | Gilhousen | |
| 5,594,454 A | * 1/1997 | Devereux et al. | 342/357.09 |
| 5,604,806 A | * 2/1997 | Hassan et al. | 380/44 |
| 5,647,379 A | * 7/1997 | Meltzer | 128/897 |
| 5,905,943 A | * 5/1999 | Wiedeman et al. | 455/11.1 |
| 5,970,400 A | * 10/1999 | Dwyer | 455/254 |

FOREIGN PATENT DOCUMENTS

| | | |
|---|---|---|
| EP | 0457379 A | 11/1991 |
| FR | 2773931 A | 7/1999 |

OTHER PUBLICATIONS

RTCA, Inc.; "RTCA/DO–160D—Environmental Conditions and Test Procedures for Airborne Equipment"; Jul. 12, 1996.

Prof. Randy H. Katz; "CS 294–7: Digital Modulation"; University of California, Berkeley; 1996.

R.T. Beierle; "Mechanical Slot Design Guidelines for EMI"; Hughes Aircraft Company; 1996.

"Understanding the FCC Regulations for Low–Power, Non-Licensed Transmitters"; Federal Communications Commission, Office of Engineering and Technology; OET Bulletin No. 63, Oct. 1993.

* cited by examiner

Primary Examiner—Young T. Tse
(74) Attorney, Agent, or Firm—Harness, Dickey & Pierce, P.L.C.

(57) ABSTRACT

A wireless communication system for transmitting and receiving radio frequency (RF) signals inside an enclosure such as a hull of a torpedo, autonomous underwater vehicle, or aircraft, an automotive body, or a test equipment enclosure. The wireless communication system employs low power, low frequency, spread spectrum signals to reduce multi-path transmission and reception problems inside the enclosure. The wireless communication system includes first and second electronic devices located in the enclosure. A first transmitter/receiver is connected to the first electronic device. The first transmitter/receiver transmits spread spectrum signals generated by the first electronic device and receives spread spectrum signals. A second transmitter/receiver is connected to the second electronic device. The second transmitter/receiver transmits spread spectrum signals generated by the second electronic device and receives spread spectrum signals. The first and second transmitter/receivers operate above a thermal noise threshold of the first and second transmitter/receivers and below electromagnetic compatibility (EMC) and electromagnetic interference (EMI) standards. If the enclosure includes walls which separate the enclosure into multiple sections and the enclosure is metallic, apertures filled with a dielectric material and a dipole penetrator antennas can be employed to reduce attenuation.

20 Claims, 3 Drawing Sheets

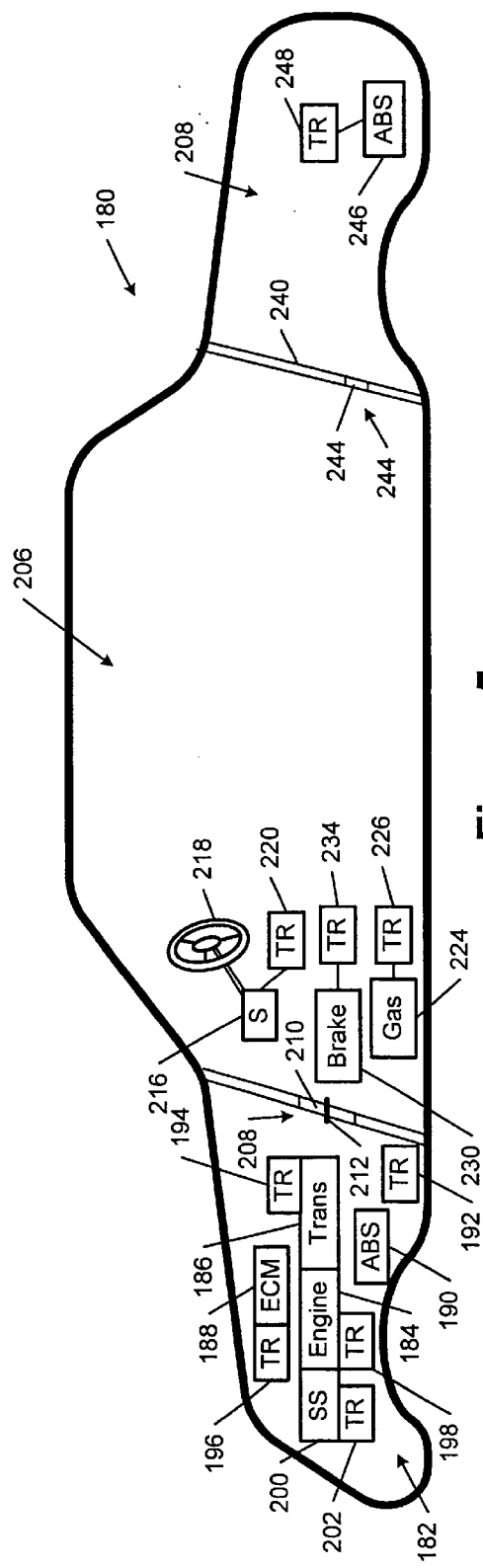
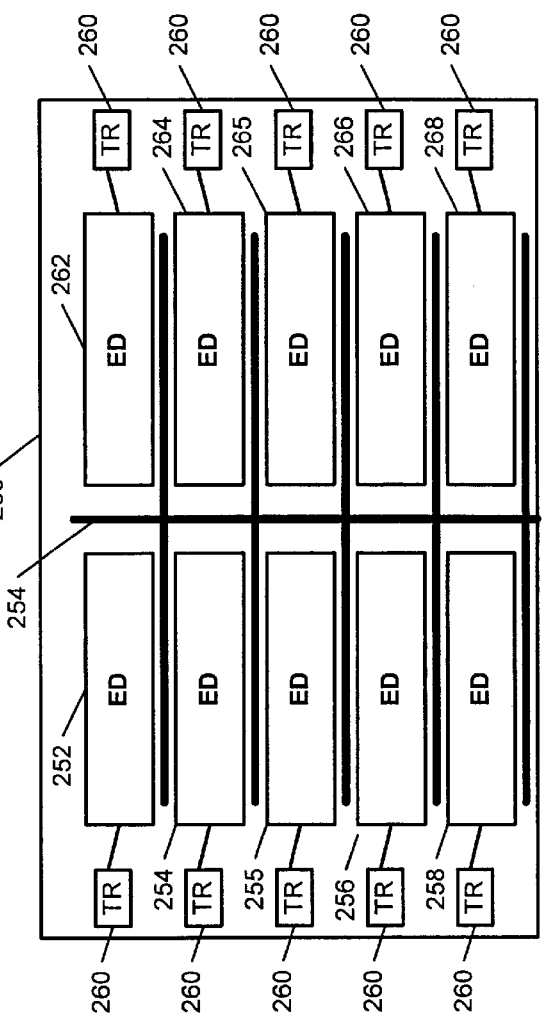

WIRELESS INTERFACE FOR ELECTRONIC DEVICES LOCATED IN ENCLOSED SPACES

TECHNICAL FIELD

This invention relates to wireless communication systems and, more particularly, to a wireless communication system for electronic devices that are located in an enclosed space having a high likelihood of multi-path transmission and reception problems and that are subject to electromagnetic compatibility (EMC) and electromagnetic interference (EMI) requirements.

BACKGROUND OF THE INVENTION

Autonomous underwater vehicles (AUV's), torpedoes, automobiles, aircraft, test equipment suites, etc., typically require extensive cables, optical fiber, wiring harnesses, and/or connectors to support communications and control signals. These signals are typically sent from one electronic device across the cables or optical fiber to one or more other electronic devices. In these applications, the communicating electronic devices are typically sensors, motors, valves, actuators, processors, communications devices, navigation devices, etc. The electronic devices are generally located inside an enclosure such as a hull of an AUV, torpedo or aircraft, a metallic body of an automobile, a cabinet for test equipment, etc.

The cable and/or optical backbones, harnesses and connectors occupy the interior space of the enclosure which could otherwise be used to carry payload, other electrical sensing or control devices, and/or additional passengers. The cable and/or optical fiber, harnesses and connectors also increase the weight of the AUV, torpedo, automobile and aircraft which reduces the range and efficiency of the vehicle.

When extensive cabling and/or optical backbones are employed in the enclosure, diagnosis of electrical faults becomes more problematic. The cables and/or optical fiber are generally run together so that identification of one of the cables or optical fibers can be difficult. Because the turn-around time for repairs increases due to the increased troubleshooting time required, the uptime of the AUV, torpedo, aircraft, automobile, or test equipment decreases. When sensor configuration changes and/or equipment upgrades are required, routing additional cables and/or optical fiber can be very difficult due to the existing cabling and/or optical backbone.

To ensure robust electromagnetic compatibility (EMC) and electromagnetic interference (EMI) behavior, cables often require expensive shielding, particularly when the cables run adjacent a power source or other cables. Cables that are routed through an aperture in a bulkhead often wear prematurely due to abrasive contact with corners of the aperture. Premature wear can cause an intermittent short circuit or an open circuit which can be difficult to diagnose. In addition, cables and optical fiber also can require special connectors which can be expensive.

For example, an AUV typically includes a vehicle control processor (VCP) which is connected to a power supply such as a battery and to one or more power distribution units (PDU). The PDU, in turn, are typically connected to one or more sensors that monitor temperature, salinity, inertia, speed, spatial orientation, and/or pressure. The PDU can also be connected to the motor of the AUV, valves associated with ballast tanks, and actuators associated with the dive planes or rudder. The PDUs relay control and sensor information to the VCP where decisions are made. As can be appreciated, the length and weight of cable and/or optical fiber that is required to interconnect the valves, sensors, VCP and PDU can be significant. The interconnections are often made more difficult by firewalls or bulkheads that separate the valves, sensors, motors, battery, VCP and PDU.

SUMMARY OF THE INVENTION

A wireless, backboneless communication system according to the present invention transmits, receives, and repeats radio frequency signals inside an enclosure which has a high likelihood of multi-path transmission and reception problems. The enclosures can be the hull of a torpedo, autonomous underwater vehicle, or aircraft, the body of an automobile, or a test equipment enclosure. First and second electronic devices are located inside the enclosure. A first transmitter/receiver and repeater is connected to the first electronic device. The first transmitter/receiver transmits spread spectrum signals generated by the first electronic device and receives spread spectrum signals. A second transmitter/receiver is connected to the second electronic device. The second transmitter/receiver transmits spread spectrum signals generated by the second electronic device and receives spread spectrum signals.

Preferably, the first and second transmitter/receivers operate at low frequencies between 100 and 900 MHz. Additionally, the first and second transmitter/receivers operate at low power which is above a thermal noise threshold of the wireless communication system and below EMC/EMI standards.

In one preferred embodiment, the data spread rate of the spread spectrum signals is approximately 10:1 and the first and second transmitter/receivers operate between 100 and 400 MHz.

In another preferred embodiment, the first electronic device is a vehicle control processor. The enclosure is a hull of an autonomous underwater vehicle (AUV). The second electronic device is a power distribution unit. The hull preferably includes a first bulkhead that separates the hull into first and second sections. The first electronic device and the first transmitter/receiver are located in the first section. The second electronic device and the second transmitter/receiver are located in the second section.

If the bulkhead is made of a metallic material, the bulkhead preferably includes an aperture filled with a dielectric material. A dipole penetrator is located in the dielectric and extends outwardly from opposite sides of the dielectric. The dipole penetrator reduces signal attenuation between the first and second transmitter/receivers.

In another embodiment, the PDU communicates with a sensor for measuring an environmental characteristic, an actuator for controlling at least one of a dive plane and a rudder, and a valve associated with a ballast tank.

In yet another preferred embodiment the enclosure is a hull of an aircraft, and the first electronic device is an audio/video server. The second electronic device is an audio/video playback device that is located adjacent a passenger seat.

In still other preferred embodiments, the wireless communication system according to present invention is located inside an automobile or in a test equipment enclosure.

The various preferred embodiments of the wireless communication system according to the present invention allow wireless transmission and reception of signals inside an enclosure without significant multi-path problems. By reducing or eliminating cables, optical fiber, connectors and shielding, additional interior space inside the enclosure becomes available and allows increased payload, increased electronic devices, and/or reduced weight.

BRIEF DESCRIPTION OF THE DRAWINGS

The various advantages of the present invention will become apparent to skilled artisans by reading the following specification and subjoined claims and by referencing the following drawings in which:

FIG. 5 is a side cross-sectional view of an automobile body and a block diagram view of a third embodiment of the wireless communication system according to the present invention; and FIG. 6 is a side cross-sectional view of a test equipment enclosure and a functional block diagram of a fourth embodiment of a wireless communication system according to the present invention.

DETAILED DESCRIPTION OF THE PREFERRED EMBODIMENTS

Figure 1:
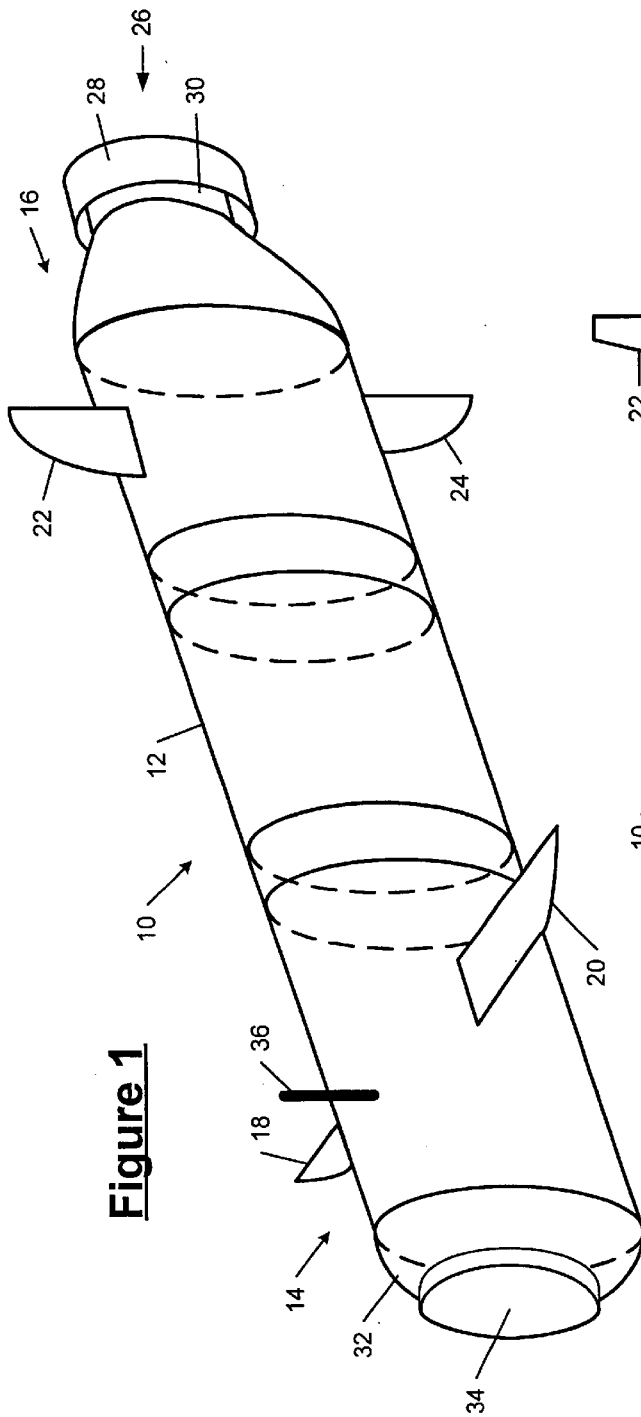
FIG. 1 is a side perspective view of an autonomous underwater vehicle (AUV)

A wireless communication system according to the present invention eliminates most or all of the cable and optical backbone required to interconnect multiple electronic devices inside an enclosure. The present invention advantageously employs low power and low frequency transmitter/receivers that radiate power at levels above a thermal noise level of the communication system and below electromagnetic compatibility (EMC) and electromagnetic interference (EMI) requirements commonly required in aircraft applications while minimizing multi-path problems.

High signal to noise transmission techniques, such as spread spectrum transmission, provide reliable data transmission and reception at distances often encountered in the enclosures. Spread spectrum techniques are discussed more thoroughly in "Voice Link Over Spread Spectrum Radio", James A. Vincent, Electronics World, September/October 1989, which is hereby incorporated by reference. The wireless communication system according to the present invention is capable of transferring data at rates between 10 and 100 Mbits per second. Transmission rates between 10 and 40 Mbits/second allows sufficient data transfer and can accommodate compressed audio and video signals that are transmitted within the enclosures.

Low level radio frequency (RF) transmissions can be utilized for internal communications in an enclosure (even a metallic enclosure such as a hull or an aircraft, AUV or torpedo or and auto body) if the following criteria are met. The bandwidth of thermal noise must be less than the EMC/EMI requirements of a particular application. Aircraft EMC/EMI requirements are typically very stringent. The radiated power of transmitters that are employed must be sufficient to be received at a distance required by the application with adequate signal to noise (S/N) ratios. In an autonomous underwater vehicle (AUV), the transmission/reception distance that is required is typically about 20 feet. To handle a sufficient amount of data, the wireless communication system should be capable of handling data transfer rates up to 100 Mbits per second. Because only 40 Mbits per second are required for the AUV application, the following discussion relates to a system providing 40 Mbits per second. The radiated frequencies and types of transmission must be selected to provide a robust multi-path environment. The high frequency (above 1 GHz), high power transmitters that would typically be employed in conventional applications cause excessive multi-path problems in the enclosures and exceed the EMC/EMI requirements.

Thermal noise can be calculated for any given −3 dB bandwidth from the following equation:

$$V_{rms} = [KTBwR]^{1/2}$$

Where K is Boltzmann's constant (K=1.326×10$^{-23}$), T is the ambient temperature in degrees Kelvin (T=300° for this example), $Bw_1$=100×10$^6$ Hz for a 10 Mbits/sec data rate, $Bw_2$=400×10$^6$ Hz for a 40 Mbits/sec data rate, and R is resistance (50 Ohms in this example). Therefore:

$$V_{rms} = [1.326 \times 10^{-23} \times 300 \times 10 \times 10^6 \times 50]^{1/2}$$

$$V_{rms} = 4.5 \times 10^{-6} (\text{Volts } RMS @ Bw)$$

$$V_{rms} = 8.9 \times 10^{-6} (\text{Volts } RMS @ Bw_2)$$

$$P = E^2/R = KTBwR/R = KTBw$$

$$P_{rcvr} = 10 \text{ Log}_{10}(KTBw)(\text{db } W)$$

$$P_{rcvr1} = -124(\text{db } W) @ Bw_1 \text{ and } 10{:}1 \text{ spread}$$

$$P_{rcvr2} = -118 (\text{db } W) @ Bw_2 \text{ and } 10{:}1 \text{ spread}$$

This is the thermal noise power for 100 MHz and 400 MHz bandwidth signals for a 50 Ohm receiving system that is transmitting at data rates between 10 and 40 Mbits/second. Therefore, the transmitted signals must exceed the thermal noise power prior to reception at the receiver.

The radiated minimum power required for a transmission range of 20 feet at the receiver can be calculated from the following formulas:

$$CP_{rcvr} = 10 \text{ Log}_{10}(Ps) = 10 \text{ Log}_{10}(G_r) - 20 \text{ Log}_{10}(4BD_f/C)$$

Where $P_s$ is the transmit power, $G_s$ is the transmitter antenna gain, $G_r$ is the receiver antenna gain, $CP_{rcvr}$ is the carrier power at the receiver antenna, and −20 Log$_{10}$(4BD$_f$/C) is the spatial path loss between transmit and receiver antennas. For this derivation, $G_s$=$G_r$=1 which is unity gain for ideal isotropic radiator. The center frequency equals 300 MHz. Therefore:

$$CP_{rcvr} = 10 \text{ Log}_{10}(P_s) - 20 \text{ Log}_{10}(4BD_f/C)$$

$$\text{Path Loss} = 20 \text{ Log}_{10}(4B \times 6 \times 300 \times 10^6/3 \times 10^8) = 37.5(\text{db W})$$

$$CP_{rcvr} = 10 \text{ Log}_{10}(P_s) - 37.5(\text{db W})$$

For $CP_{rcvr} = P_{rcvr}$ and 10 Log$_{10}$($P_s$)=Transmit Power Minimum (TPM)

$$TPM_1 = -124 + 37.5 = -86(\text{db W}) = 2.5 \times 10^{-9} \text{ Watt}$$

$$TPM_2 = -118 + 37.5 = -81(\text{db W}) = 7.9 \times 10^{-9} \text{ Watt}$$

This is the minimum transmission power that is required to exceed the thermal noise at the receiving antenna for a distance of 20 feet and data rates between 10 and 40 Mbits per second. For additional antenna information, consult "Antenna Theory", A. Barns, Harper & Row, New York 1982, which is hereby incorporated by reference.

The maximum transmitted power of a communication system is often limited by several different applications. For example, aircraft communication systems and electronics must meet the standards set forth by "RTCAI/DO-160D", published by RTCA, Inc., 1140 Connecticut Avenue, N.W. Suite 1020, Washington, D. C. 20036, which is hereby incorporated by reference. For a system operating between 100 and 400 MHz, the EMI/EMC standard is 35 db: V. Converting db: V/m to volts@ 1 meter:

db: $V=20\ Log_{10}(V/1\times 10^{-6})=35$ db: $V=5.6\times 10^{-5}$ Volts@1 m for db W conversion:=10 $Log_{10}(V/7.07)=-51$ db $W@$ 1 m The path loss for 1 meter is given as:

Path Loss=20 $Log_{10}(4BD_f/C)$=20 $Log_{10}(4B\times 1\times 300\times 10^6/3\times 10^8)$= 22.0 (db W)

$CP_{rcvr}$=10 $Log_{10}(P_s)$-20 $Log_{10}(4BD_f/C)$=10 $Log_{10}(P_s)$-22.0

10 $Log_{10}(P_s)$=Transmit Power=-51+22 =-298db W (Maximum)= $1.26\times 10^{-3}$Watt maximum This translates to a receiver antenna maximum of less than $2.24\times 10^{-7}$ Watts with a path loss of -37.5 dB and converts to an antenna voltage for a 50 Ohm system of $3.4\times 10^{-3}\ V_{rms}$. Assuming a total aperture loss of -20 dB, the antenna voltage is reduced to $340\times 10^{-6}\ V_{rms}$ which is an easily detectable signal level.

Since the foregoing analysis was based on free air transmission, additional modifications to the transmitter power requirements must be made to allow for attenuation due to bulkheads. A non-metallic bulkhead allows for maximum range. Suitable non-metallic bulkheads can be fabricated from fiberglass and/or other non-metallic materials. If conductive bulkheads are required, aperture slots that are filled with a dielectric material are used as will be described further below. Preferably, the dielectric material provides a minimum of attenuation.

From Table 1 set forth below, it can be estimated that a circular aperture of 13 centimeters yields negative 7 dB attenuation per bulkhead. Therefore, four bulkheads for this aperture would yield negative 28 dB attenuation. Additionally, a dipole penetrator that projects outwardly from the dielectric material in a perpendicular direction to the bulkhead can be added to further reduce the attenuation to less than -3 dB loss per bulkhead.

TABLE 1

| | Aperture Slot Attenuation Maximum Frequency | | | | |
|---|---|---|---|---|---|
| Attenuation | 100 Mhz | 500 Mhz | 1 Ghz | 6 Ghz | |
| -40 db | 5 cm | 0.8 cm | — | — | Max |
| -30 db | 10 cm | 1.5 cm | 0.75 cm | — | Slot |
| -20 db | 15 cm | 3.0 cm | 1.5 cm | — | Dimension |
| -10 db | 50 cm | 10.0 cm | 5.0 cm | 0.75 cm | |

In a further effort to minimize multipath problems and reduce wide band energy to meet the EMC/EMI requirements, it is desirable to use spread spectrum transmission and reception techniques for the wireless communication system. In a spread spectrum system, the signal to noise ratio (S/N) is usually very small—typically less than 0.1.

$D_r$=W $Log_2[1+S/N]$by derivation; $Bw\approx [Dr/1.44][S/N]$

Where Bw=Bandwidth $(Hz)_{-3db}$, Dr is the data rate in bits per second, S is the average signal power, and N is the mean white Gaussian noise power. For a data rate of 40 Mbits/sec for a 400 MHz spread bandwidth, the minimum signal to noise ratio is:

[S/N]=$D_r$/1.44$Bw$=0.069=-23.2 db

Therefore, the transmitted data can be very close to the thermal noise level and still be effective.

Process gain is a fundamental concept in spread spectrum systems. Process gain defines the S/N improvement exhibited by a spread spectrum signal due to the "spreading" process.

Process gain: $GP$=10 $Log_{10}[Bw/D_r]$

For direct spread spectrum sequences, Bw=$400\times 10^6$ Hz, data is generated at 40 Mbits/sec, and data is spread at a 10:1 ratio. Thus:

Process gain: $GP$=10 $Log_{10}[400\times 10^6/40\times 10^6]$=$^-$10 db

There are two basic types of spread spectrum transmissions—direct sequence and hopper transmission. The advantages of direct sequence spread spectrum transmission is that it requires relatively low power, provides quick lock-in, and is suitable for short indoor ranges and lower data rates. Spread spectrum systems employing direct sequence transmission are somewhat easier to design and are particularly appropriate when multi-path transmission and reception problems are significant. Hopper type spread spectrum systems have a more complicated design, require higher power and are slow to lock in. Hopper type spread spectrum systems are more suitable for long indoor ranges and higher data rates.

Skilled artisans will appreciate that low power, low frequency, spread spectrum transmission techniques described above work well inside the enclosures without encountering significant multi-path transmission and reception problems. Referring now to FIG. 1, the present invention is shown in an autonomous underwater vehicle (AUV) 10 that includes a hull 12 having forward and aft portions 14 and 16. First and second dive planes 18 and 20 extend radially outward in a horizontal direction from opposing sides of the hull 12. Upper and lower rudders 22 and 24 extend radially outward in a vertical direction from the hull 12. A thruster 26 is located adjacent the aft portion 16 of the hull 12 and includes a cylindrical guard 28 that is mounted around a ringed propeller 30.

The AUV 10 further includes a nose cone 32 at the forward portion 14 of the hull 12. An acoustic array 34 is preferably mounted on the nose cone 32. A retractable antenna 36 extends outwardly from the hull 12 and can be associated with navigational devices such as a global positioning system (GPS) described further in conjunction with FIG. 2.

Figure 2:
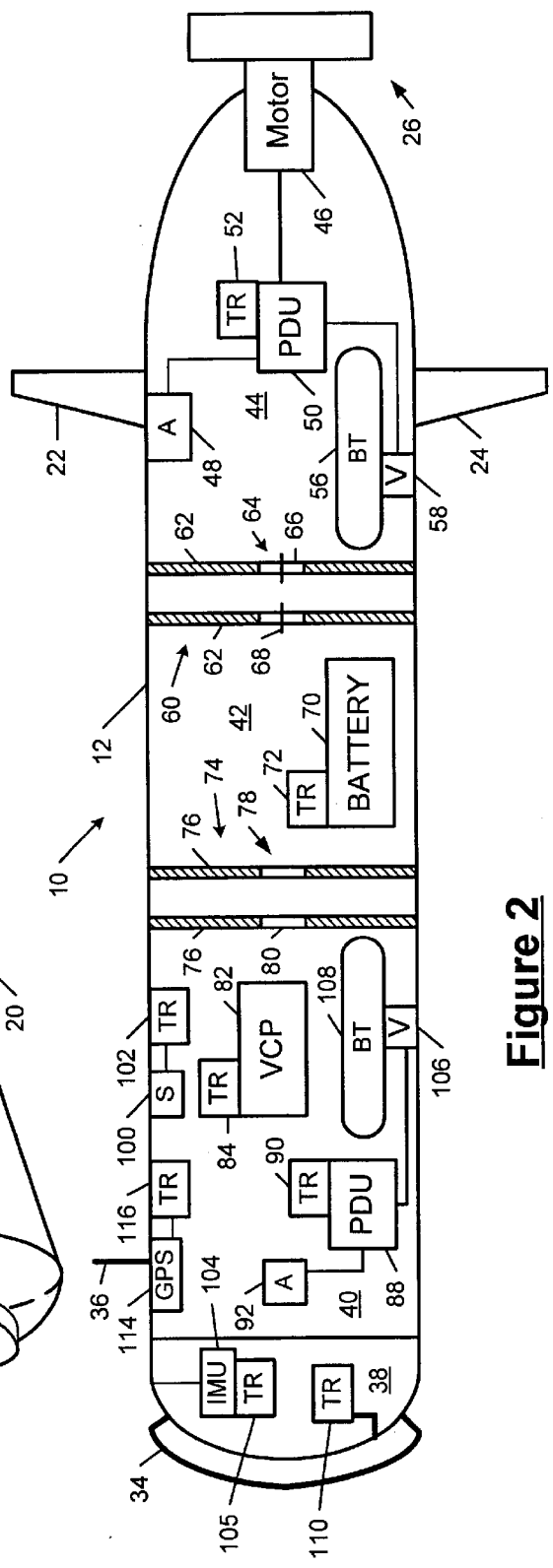
FIG. 2 is a side cross-sectional view of the AUV of FIG. 1 and a block diagram view of a first embodiment of a wireless communication system according to the present invention.

Referring now to FIG. 2, the AUV 10 includes a nose section 38, a forward section 40, a middle section 42, and an aft section 44. The aft section 44 houses an electric motor 46. An actuator 48 adjusts an angular position of the upper and lower rudders 22 and 24. A power distribution unit (PDU) 50 is connected to a transmitter/receiver 52 having an antenna (not shown). Skilled artisans will appreciate that the present invention employs multiple transmitter/receivers each of which is associated with an antenna. For purposes of simplifying the drawings, the antennas have been omitted. The PDU 50 controls the operation of a ballast tank 56 that is operated by a solenoid valve 58.

The middle section 42 of the hull 12 is separated from the aft section 44 by a bulkhead 60 that may include one or more walls 62. If the bulkhead walls 62 are metallic, the bulkhead walls 62 preferably include one or more apertures 64 that are filled by a dielectric material 66. A dipole penetrator 68 is located in the dielectric material 66 and extends outwardly from the dielectric material 66. The dipole penetrator 68 may be used to improve transmission and reduce attenuation as previously described above.

The middle section 42 preferably houses a battery 70 which is connected to a transmitter/receiver 72. A second bulkhead 74 separates the middle section 42 and the forward section 40 and includes one or more walls 76. If the walls are metallic, one or more apertures 78 that are filled by a dielectric material 80 can be used.

The forward section 40 houses a vehicle control processor (VCP) 82 which is connected to a transmitter/receiver 84. A power distribution unit (PDU) 88 is connected to a transmitter/receiver 90 and an actuator 92 for controlling the dive planes 18 and 20 that are illustrated in FIG. 1. A sensor 100 measures physical conditions such as temperature, salinity, and/or pressure. An inertial measuring unit 104 is connected to a transmitter/receiver 105. The sensor 100 is coupled to a transmitter/receiver 102. PDU 88 is also connected to a solenoid valve 106 associated with a ballast tank 108. A transmitter/receiver 110 is coupled to the acoustic array 34. A global positioning system (GPS) 114 is connected to the antenna 36 that is extended when the AUV 10 is at or near the surface. A transmitter/receiver 116 is coupled to the GPS 114.

In use, the VCP 82 gathers information from the motor 46, the sensors 100, 104, 114, valves 58 and 106, and the actuators 48 and 92 that are in communication with PDUs 50 and 88. Based on information received from the PDUs 50 and 88, the VCP 82 makes navigation decisions and transmits control signals to the PDUs 50 and 84 as needed. Then, the PDUs 50 and 84 communicate with the motor 46, the sensors 100, 104, and 114, the actuators 48 and 92, and valves 58 and 106 to execute the navigation decisions. The VCP 82 communicates by transmitting and receiving signals with the transmitter/receiver 84. The PDUs 50 and 88 transmit and receive signals using transmitter/receivers 52 and 84. The PDUs 50 and 88, in turn, transmit and receive signals to/from the actuators 48 and 92 which adjust the dive planes 18 and 20 and the rudders 22 and 24, and to the valves 58 and 106 which adjust the ballast tanks 56 and 108 respectively. Skilled artisans will appreciate that the PDUs 50 and 88 are coupled to the battery 70 via conventional power cables that are not shown. The PDUs 50 and 88 control and distribute power to the motor 46, the sensors 100, 104 and 114, the valves 58 and 106, and the actuators 48 and 92 as needed.

As can be appreciated, the wireless communication system according to the present invention significantly reduces the cable, optical fiber, shielding, and connectors which would normally be required for communications and control. While some cable or optical fiber is employed, it is preferably used on distances that are less than five (5) feet.

The transmitter/receivers preferably operate using spread spectrum techniques and have a data spread rate that is less than 20:1. In a more preferred embodiment, the data spread rate has a 10:1 ratio. The transmitter/receivers operate at relatively low frequencies, preferably between 100 and 900 MHz. In a more preferred embodiment, the transmitter/receivers operate between 100 and 400 MHz.

The transmitter/receivers preferably operate at a relatively low transmission power that is below the EMC/EMI requirement that is typically set forth for aircraft. The reception power of the transmitter/receivers is preferably above the thermal noise of the transmitter/receivers.

Skilled artisans will appreciate that the combination of spread spectrum transmission, low power, and low frequency significantly reduces multi-path problems inside the enclosure such as the hull 12 of the AUV 10. While reducing multi-path problems, the present invention provides sufficiently high data rates to accomplish communications, navigation, and control of devices such as sensors, valves, actuators and motors wirelessly in an enclosed space. By reducing the cables, optical fiber, connectors and shielding, the cost and weight of the AUV 10 can be significantly reduced while increasing interior space for payload and/or increasing the range of the AUV 10.

Figure 3:
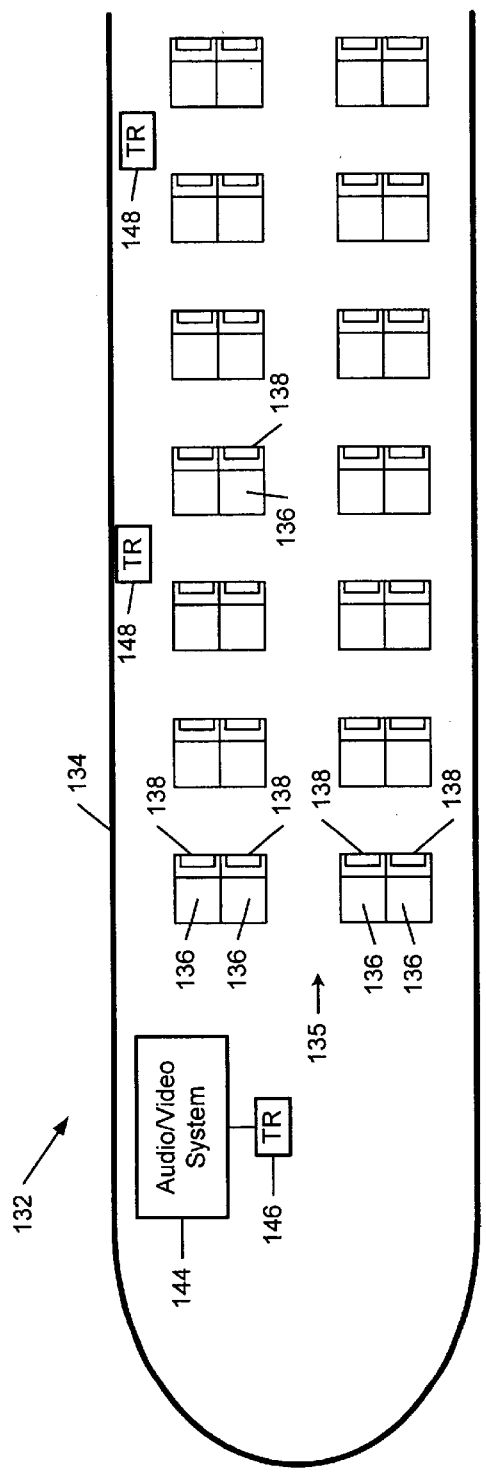
FIG. 3 is a plan cross-sectional view of an aircraft illustrating a second embodiment of the wireless communication system according to the present invention.
Figure 4:
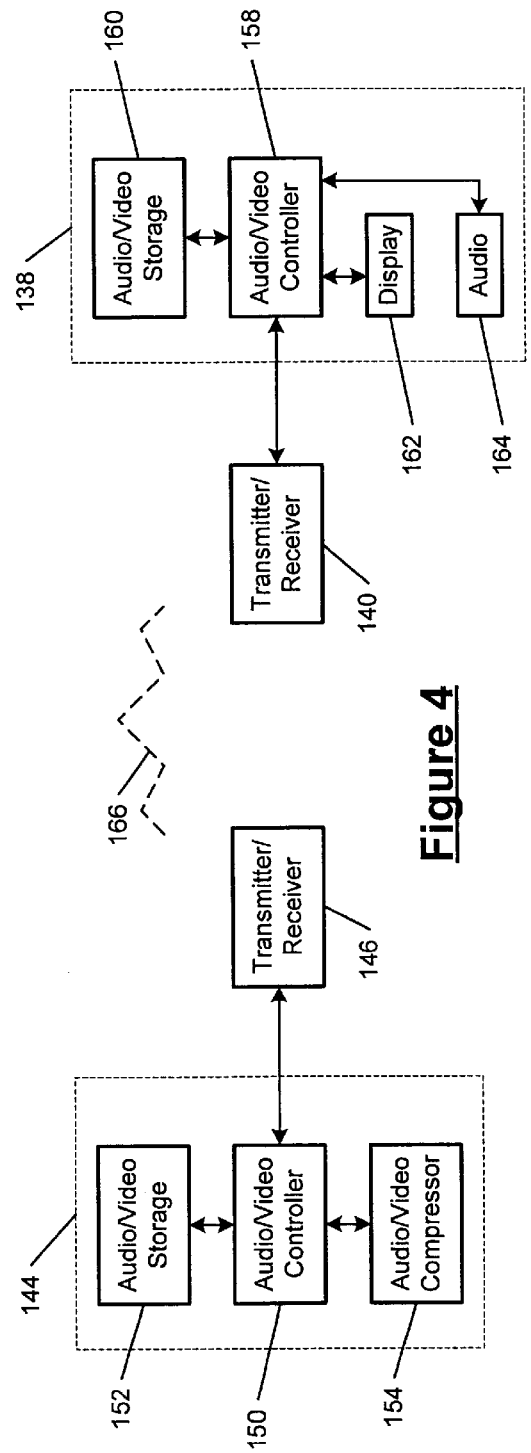
FIG. 4 is a functional block diagram of the wireless communication system of FIG. 3.

In FIGS. 3 and 4, a wireless communication system 130 is installed in an aircraft 132 having a hull 134. A passenger compartment 135 includes a plurality of seats 136. Each of the seats 136 preferably has an audio/video playback system 138 that is connected to a transmitter/receiver 140 (FIG. 4). The audio/video playback system 138 is illustrated as an integral part of a rearward facing surface of a seatback of a seat that is located in a row in front of the seat 136. The audio/video system 138 can also be located as a separate unit, integrated with the luggage compartment or positioned in other suitable locations. An audio/video server 144 is connected to a master transmitter/receiver 146 and one or more repeater transmitter/receivers 148.

Referring now to FIG. 4, the audio/video server 144 typically includes an audio/video controller 150 which is connected to an audio/video storage device 152. An audio/video compressor 154 may be employed to compress the data and to reduce the bandwidth required to transmit the data. The transmitter/receiver 146 is preferably coupled to the audio/video controller 150.

The audio/video playback system 138 typically includes an audio/video controller 158 which is connected to an audio/video storage device 160. The audio/video storage device 160 can be a buffer for temporarily storing audio or video signals as they are received from the audio/video server 144. Alternately, the audio/video storage device 160 can be omitted where real-time playback is desired. The audio/video controller 158 is also connected to a display unit 160 and to an audio output device 164 such as headphones or a speaker.

As with the embodiment illustrated in FIGS. 1 and 2, the transmitter/receivers in FIGS. 3 and 4 preferably employ spread spectrum transmission, low power, and low frequency as described above which significantly reduces multi-path problems inside the aircraft hull 134. In addition, the cable, fiber optic, connectors, and shielding can be reduced or eliminated between the audio/video server 144 and the audio/video playback devices 138 located in the seats 136. By reducing weight, the present invention allows increased passenger payload and/or improved range and efficiency for the aircraft 132.

Referring now to FIG. 5, an automobile 180 is illustrated and includes an engine compartment 182 in which an engine 184, a transmission 186 and an engine control module (ECM) 188 are located. An anti-lock braking system (ABS) 190 is located in engine compartment 182 and is connected to a transmitter/receiver 192. Likewise, the transmission 186, the engine 184, and the ECM 188 can be connected to one or more transmitter/receivers 194, 196 and 198, respectively. A steering system 200 is located in the engine compartment 182 and is connected to a transmitter/receiver 202.

A firewall 204 separates engine compartment 182 from passenger compartment 206. If the firewall 204 is made of a metallic material, the firewall 204 preferably includes an aperture 208 with a dielectric material 210. A dipole penetrator 212 can be used to reduce attenuation in a manner similar to that described above with respect to FIG. 2.

The passenger compartment 206 includes a steering sensor 216 that is connected to steering wheel 218 and a transmitter/receiver 220. A gas pedal sensor 224 is connected to a gas pedal (not shown) and a transmitter/receiver 226. A brake pedal sensor 230 is connected to a brake pedal (not shown) and a transmitter/receiver 234.

A trunk compartment 208 is separated from passenger compartment 206 by a wall 240. The wall 240 includes an aperture 242 if the wall 240 is made of a metallic material. A dielectric material 244 is located in aperture 242. A dipole penetrator can be employed to reduce attenuation if desired. An ABS sensor 246 is connected to a transmitter/receiver 248 having an antenna in a trunk compartment 208.

As can be appreciated, the various sensors, control modules, and systems communicate via the transmitter/receivers. For example, when the steering wheel 218 is rotated, the sensor 216 transmits a signal via transmitter/receiver 202 associated with the steering system 200. Likewise, the gas pedal sensor 224 communicates with the ECM 188, and the brake pedal sensor 230 communicates with the ABS 190 and 246.

The automobile has a limited amount of space within the engine compartment 182, the passenger compartment 206, and the trunk compartment 208. By eliminating the cables, fiber optic lines, connectors, and shielding used to connect the electronic devices located therein, increased room is made available for other uses and the weight of the communication and control system is reduced.

The transmitter/receivers employed in FIG. 5 preferably operate using spread spectrum transmission, low power, and low frequency as disclosed above with respect to FIGS. 1 to 4. By employing spread spectrum, low power and low frequency, multi-path problems inside of the automobile 180 can be significantly reduced or eliminated while sufficient data rates are provided. A low EMI/EMC profile is also provided.

Referring now to FIG. 6, an enclosure 250 houses a plurality of electronic devices 252, 254, 255, 256, 258, 262, 264, 265, 266, and 268 that are connected to transmitter/receivers 260 and are arranged on a rack 253. The cables or optical fiber required to interconnect each electronic device to one or more ports on the other electronic devices can be extensive. Multi-path problems inside the enclosure prohibit high frequency, high power signals. The wireless communication system according to the present invention eliminates the foregoing problems by employing low power, low frequency, spread spectrum transmitter/receivers. Similar advantages to those described above with respect to FIGS. 1–5 are realized.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A wireless, backboneless communication system for transmitting and receiving radio frequency (RF) signals inside an enclosure having a high likelihood of multipath transmission and reception wherein the strength of said RF signals outside of said enclosure is limited by electromagnetic compatibility (EMC) and electromagnetic interference (EMI) standards, comprising:

a first electronic device located in said enclosure;

a second electronic device located in said enclosure;

a first transmitter/receiver connected to said first electronic device for transmitting spread spectrum signals based on first transmit data generated by said first electronic device and for receiving spread spectrum signals; and a second transmitter/receiver connected to said second electronic device for transmitting spread spectrum signals based on second transmit data generated by said second electronic device and for receiving spread spectrum signals, wherein said first and second transmitter/receivers operate between 100 to 900 MHz and said spread spectrum signals generated by said first and second transmitter/receivers are above a thermal noise threshold of said first and second transmitter/receivers and are below said EMC/EMI standards.

2. The wireless communication system of claim 1 wherein said spread spectrum signals generated by at least one of said first and second transmitter/receivers have a data spread rate which is less than twenty to one.

3. The wireless communications system of claim 2 wherein said data spread rate is approximately ten to one.

4. The wireless communication system of claim 1 wherein said first and second transmitter/receivers operate between 100 and 400 MHz.

5. The wireless communication system of claim 1 wherein said first and second transmitter/receivers have a minimum data rate of 10 Mbits per second.

6. The wireless communication system of claim 5 wherein said first and second transmitter/receivers transmit data at 40 Mbits per second.

7. The wireless communication system of claim 1 wherein said first electronic device is a vehicle control processor (VCP), said enclosure is a hull of an autonomous underwater vehicle (AUV), and said second electronic device is a power distribution unit (PDU).

8. The wireless communication system of claim 7 wherein said hull includes a first bulkhead that separates said hull into first and second sections, and wherein said VCP is located in said first section and said PDU is located in said second section.

9. The wireless communication system of claim 8 wherein said bulkhead is made of a metallic material and includes an aperture filled with a dielectric.

10. The wireless communication system of claim 9 further including a dipole penetrator located in said dielectric and extending outwardly from opposite sides of said dielectric.

11. The wireless communication system of claim 7 wherein said PDU communicates with a sensor for measuring an environmental characteristic.

12. The wireless communication system of claim 7 wherein said PDU communicates with a valve associated with a ballast tank.

13. The wireless communication system of claim 1 wherein said enclosure is an aircraft hull.

14. The wireless communication system of claim 13 wherein said first electronic device is an audio/video server and said second electronic device is an audio/video playback device located adjacent a passenger seat.

15. The wireless communication system of claim 1 wherein said enclosure is an automobile.

16. The wireless communication system of claim 1 wherein said enclosure is a test equipment enclosure.

17. A wireless communication system for transmitting and receiving radio frequency (RF) signals inside an enclosure having a high likelihood of multipath transmission and reception wherein the strength of said RF signals outside of said enclosure is limited by electromagnetic compatibility (EMC) and electromagnetic interference (EMI) standards, comprising:

a first electronic device located in said enclosure;

a second electronic device located in said enclosure;

a first transmitter/receiver connected to said first electronic device for transmitting spread spectrum signals based on first transmit data generated by said first electronic device and for receiving spread spectrum signals; and a second transmitter/receiver connected to said second electronic device for transmitting spread spectrum signals based on second transmit data generated by said second electronic device and for receiving spread spectrum signals, wherein said first and second transmitters/receivers operate between approximately 100 and 400 MHz, employ a data spread rate of approximately ten to one, and transmit and receive data between 10 and 40 Mbits per second, and wherein said spread spectrum signals generated by said first and second transmitter/receivers have a signal power above a thermal noise threshold of said first and second transmitter/receivers and below said EMC/EMI standards.

18. A method of transmitting and receiving radio frequency signals between first and second electronic devices located inside an enclosure having a high likelihood of multipath transmission and reception, comprising the steps of:

generating a first spread spectrum signal using a first transmitter/receiver connected to said first electronic device;

generating a second spread spectrum signal using a second transmitter/receiver connected to said second electronic device;

transmitting said spread spectrum signals in a frequency range between 100 and 900 MHz;

setting a maximum signal power of said spread spectrum signals below an electromagnetic compatibility (EMC) and electromagnetic interference (EMI) standard for radio frequency transmissions outside of said enclosure; and setting a minimum signal power of said spread spectrum signals above a thermal noise threshold for said first and second transmitter/receivers.

19. The wireless communications system of claim 18 further comprising the step of using a data spread rate of approximately ten to one.

20. The wireless communications system of claim 18 wherein a first frequency range is between 100 and 400 MHz.

* * * * *